(12) United States Patent
Scott (10) Patent No.: US 12,413,577 B2
(45) Date of Patent: Sep. 9, 2025

(54) SYSTEMS AND METHODS FOR IMPLEMENTING COMPUTER TRANSMISSION SECURITY PROTOCOL

(71) Applicant: WIRESAFE LLC, San Francisco, CA (US)

(72) Inventor: Dale A. Scott, San Francisco, CA (US)

(73) Assignee: WIRESAFE LLC, San Francisco, CA (US)

( * ) Notice: Subject to any disclaimer, the term of this patent is extended or adjusted under 35 U.S.C. 154(b) by 150 days.

(21) Appl. No.: 18/306,115

(22) Filed: Apr. 24, 2023

(65) Prior Publication Data

US 2023/0262051 A1    Aug. 17, 2023

(51) Int. Cl.
*H04L 9/40* (2022.01)

(52) U.S. Cl.
CPC ........ *H04L 63/083* (2013.01); *H04L 63/0853* (2013.01); *H04L 63/1466* (2013.01); *H04L 63/20* (2013.01)

(58) Field of Classification Search
CPC .......................... H04L 63/083; H04L 63/0853
USPC .............................................................. 726/1
See application file for complete search history.

(56) References Cited

U.S. PATENT DOCUMENTS

| | | | |
|---|---|---|---|
| 9,071,618 B1 * | 6/2015 | Pruthi | ................... H04L 63/105 |
| 11,070,540 B1 * | 7/2021 | Singh | ................... H04L 63/104 |

* cited by examiner

*Primary Examiner* — Anthony D Brown
(74) *Attorney, Agent, or Firm* — PERKINS COIE LLP (57) ABSTRACT

A computer-implemented method for performing a bifurcated confirmation process via a resetting webpage form defending against Man-In-The-Middle attacks. An exemplary use case is that of municipal bond closing which is typically performed via large email lists and is subject to Man-In-The-Middle hijacking attacks. The process typically involves a large number of advisors and reviewing entities, any of one of which could become compromised and lead to substantial theft. A disclosed resetting webpage form flips the arrangement such that all of the computers would need to be compromised in order for the attack to be successful. The webpage form further includes verification of data where the multiple parties independently log onto the online platform and indicate validation of the data wherein any change in the data causes all validation indications to become reset, restarting the process.

19 Claims, 6 Drawing Sheets

SYSTEMS AND METHODS FOR IMPLEMENTING COMPUTER TRANSMISSION SECURITY PROTOCOL

BACKGROUND

Email is a method of exchanging messages between people using electronic devices. Email was conceived as the electronic (digital) version of, or counterpart to, mail, at a time when "mail" meant only physical mail. Email later became a ubiquitous communication medium, to the point that in current use, an email address is often treated as a basic and necessary part of many processes in business, commerce, government, education, entertainment, and other spheres of daily life in most countries. Email is the medium, and each message sent therewith is called an email.

Like other forms of information technology, email is vulnerable to attacks such as account hacking and information interception. Especially in the case of sensitive email information like work documents, private messages and financial transaction confirmations, these threats can result in identity theft, privacy loss and even financial losses. While no amount of security measures can make online information 100 percent safe, secure email clients can minimize these threats, and differ from unsecured clients in several important ways.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

A number of sensitive information transactions occur via email. Standard emailing is an inherently unsecure format to communicate data. Disclosed herein is a protocol whereby a resetting webpage is used to enable transfer of data and confirmation thereof. In a given secured communication, multiple participants take part to confirm the veracity of data and make changes to the data where necessary. Where email is the primary format for the communication a man-in-the-middle (MITM) attack that changes some of the data after a corresponding party has confirmed that respective data is problematic. Because the verifying party has already performed their verification, the MITM attack is enabled to make changes (e.g., change account numbers) without other parties becoming aware of the attack.

A resetting webpage makes use of login information for each party relevant to the secured communication. The data is read only with respect to all data that does not pertain to each given user and read/write for the data that does pertain to a given user. Data read/write restriction is delineated by login information. The webpage includes verification toggles whereby a party to the communication is enabled to verify the portion of the communication that pertains to them. However, if any changes are made to the data, all or a subset of the verification toggles reset. Thus, protocol dictates that any change to the data resets the communication thereby preventing the MITM attack that modifies data after confirmed.

Login information could be compromised, but if changes are made the verification toggles reset alerting all parties to the change. Where the party with the compromised login did not personally make the change, the resetting of the webpage indicates that unauthorized changes were made and that the communication is compromised. An attacker in a MITM scenario largely seeks to go undetected, thus increasing visibility to the process where changes are made decreases the opportunities of MITM attackers and increases the chances that those same attackers are caught.

An example of such an information transaction is issuance of municipal bonds. In the process of issuing municipal securities, there is typically a two-week period between the sale of the securities and the time when funds are wired from the underwriter or some other purchaser of the bonds (the "Wire-Sender")_to the recipient of the funds such as a trustee bank or escrow bank (the "Wire-Receiver). This process is referred to as the closing. During this time, documentation is prepared for the deal's closing. One of these documents is the closing memo that includes instructions regarding wiring of bond funds from the Wire Sender to the Wire Receivers. A wire transfer, bank transfer, or credit transfer is a method of electronic funds transfer from one person or entity to another. A wire transfer can be made from one bank account to another bank account, or through a transfer of cash at a cash office.

Different wire transfer systems and operators provide a variety of options relative to the immediacy and finality of settlement and the cost, value, and volume of transactions. Central bank wire transfer systems, such as the Federal Reserve's Fedwire system in the United States, are more likely to be real-time gross settlement (RTGS) systems, as they provide the quickest availability of funds. This is because they post the gross (complete) entry against electronic accounts of the wire transfer system operator. Other systems, such as the Clearing House Interbank Payments System (CHIPS), provide net settlement on a periodic basis. More immediate settlement systems tend to process higher monetary value time-critical transactions, have higher transaction costs, and have a smaller volume of payments. A faster settlement process allows less time for currency fluctuations while money is in transit.

The closing memo, typically prepared by either the municipal advisor or the underwriter, provides the full American Bankers Association (ABA) routing number and the full account number. Common practice is to send this memo to an entire financing team, which typically includes a group that will often exceed 25 people from various institutions involved in the transaction. The memo is sent via unsecured email. Understanding email vulnerability requires understanding how email works. In one example, unsecured email clients relay information between servers using a protocol known as Simple Mail Transfer Protocol (SMTP). A message is not sent directly to the recipient, but rather is stored on a variety of servers on its way to the destination—just like a letter making its way through regional and local post offices.

Figure 1:
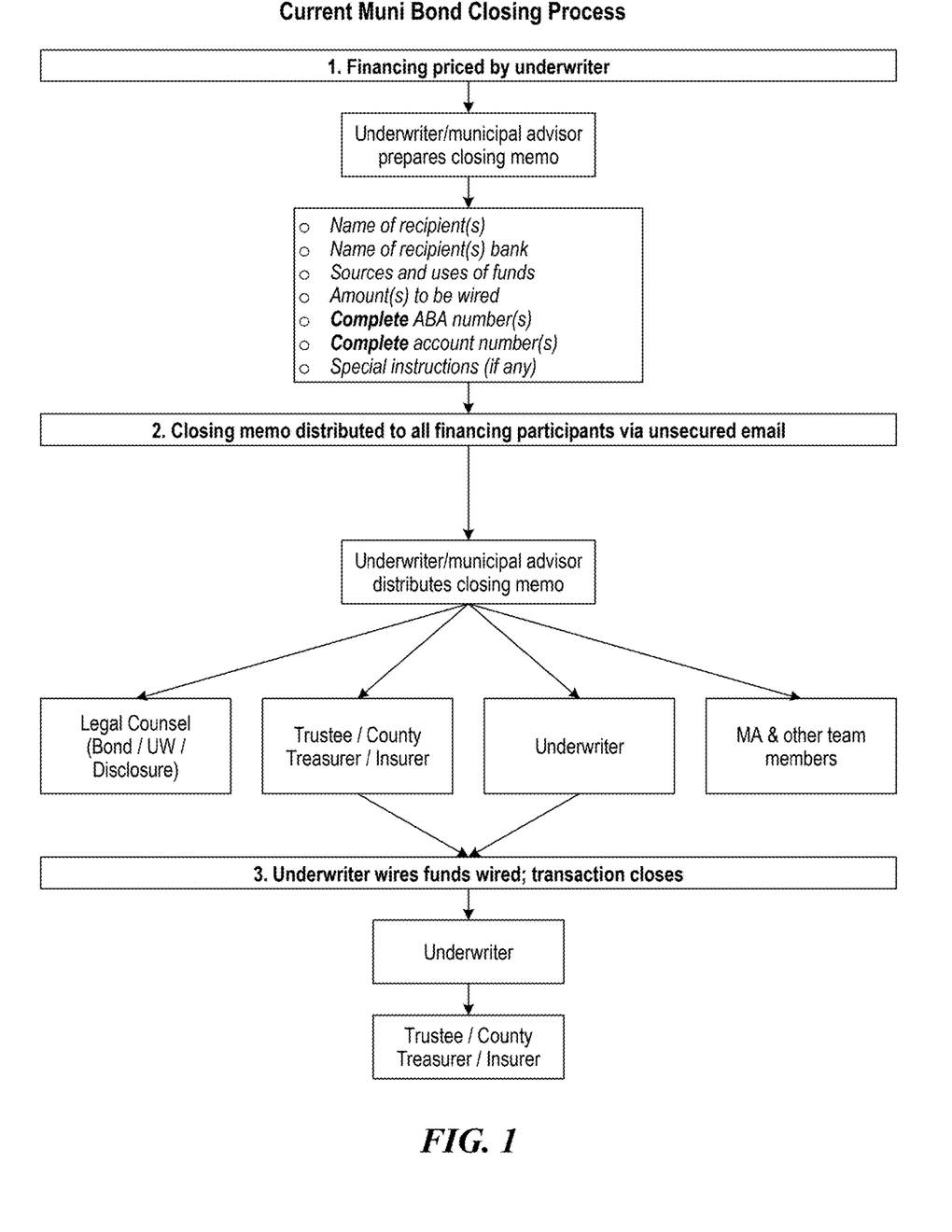
FIG. 1 illustrates a prior art process for conveying data across multiple parties using email.

FIG. 1 illustrates a process for municipal bond closing. First, financing is priced by an underwriter. The underwriter or municipal advisor prepares a closing memo. The memo can include the name of recipients, names of recipient banks, sources and uses of funds, an amount to be wired, full ABA numbers, full account numbers, and any special instructions. The closing memo is distributed to all financing participants via an unsecured email. The underwriter or municipal advisor distributes the closing memo to individuals including legal counsel, trustee/county treasurer/insurer, underwriter, municipal advisor and other team members. The underwriter wires the funds and the transaction closes.

The disclosed technology improves security of the municipal bond closing process. Specifically, the technology includes an online platform that offers bond issuers an alternative method of confirming closing information to protect against potential cybertheft of bond funds. This is done with a private, secure multi-step process for verification of wire instructions (see FIGS. 4A and 4B). The platform acknowledges the fact that even email messages, even those sent through secure services, face the risk of being intercepted by or unknowingly released to third parties. As such, the platform offers an additional level of security (illustrated in FIGS. 4A and 4B).

Figure 4A:
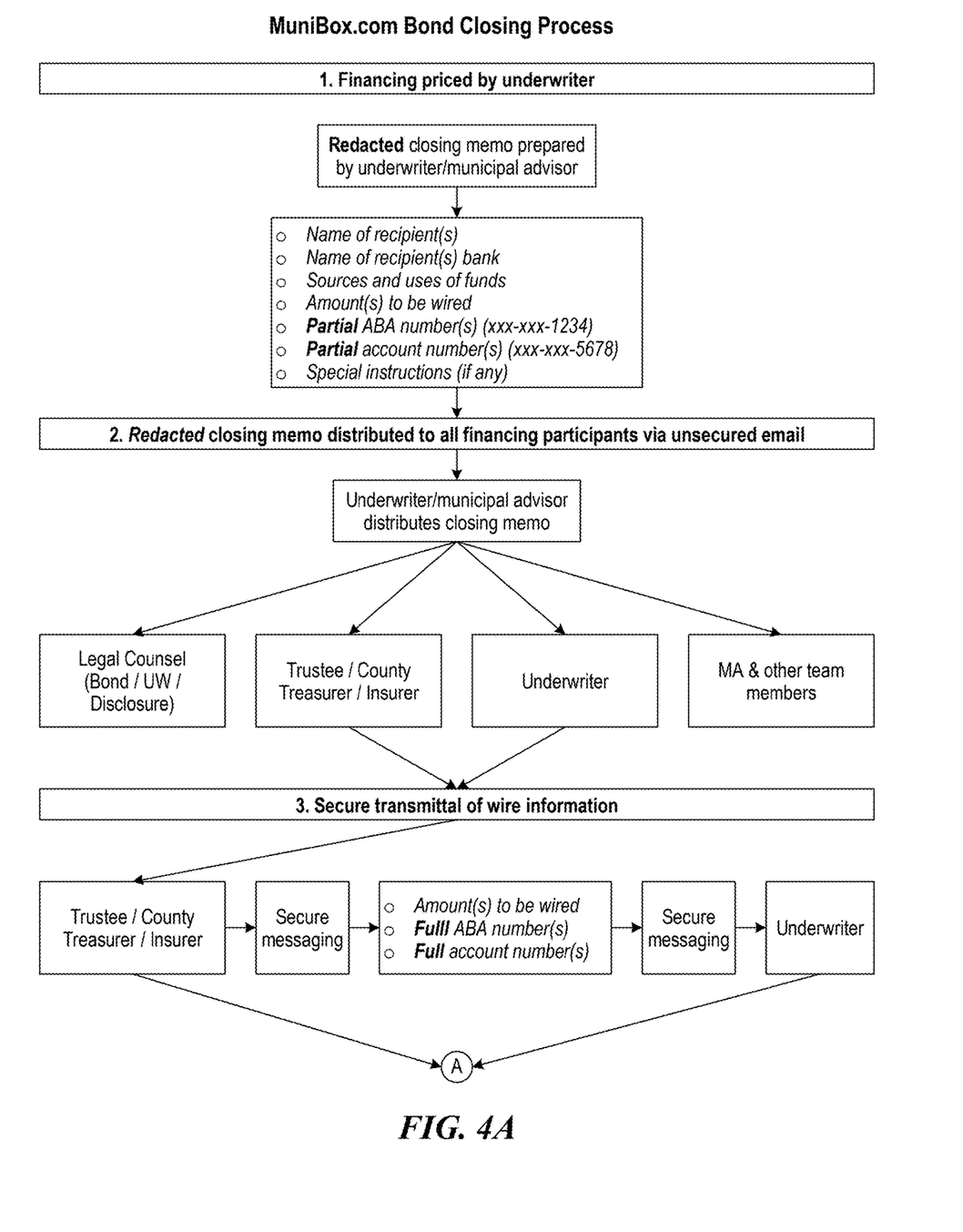
FIGS. 4A and 4B illustrate a bifurcated protocol for conveying data across multiple parties via a resetting webpage.
Figure 4B:
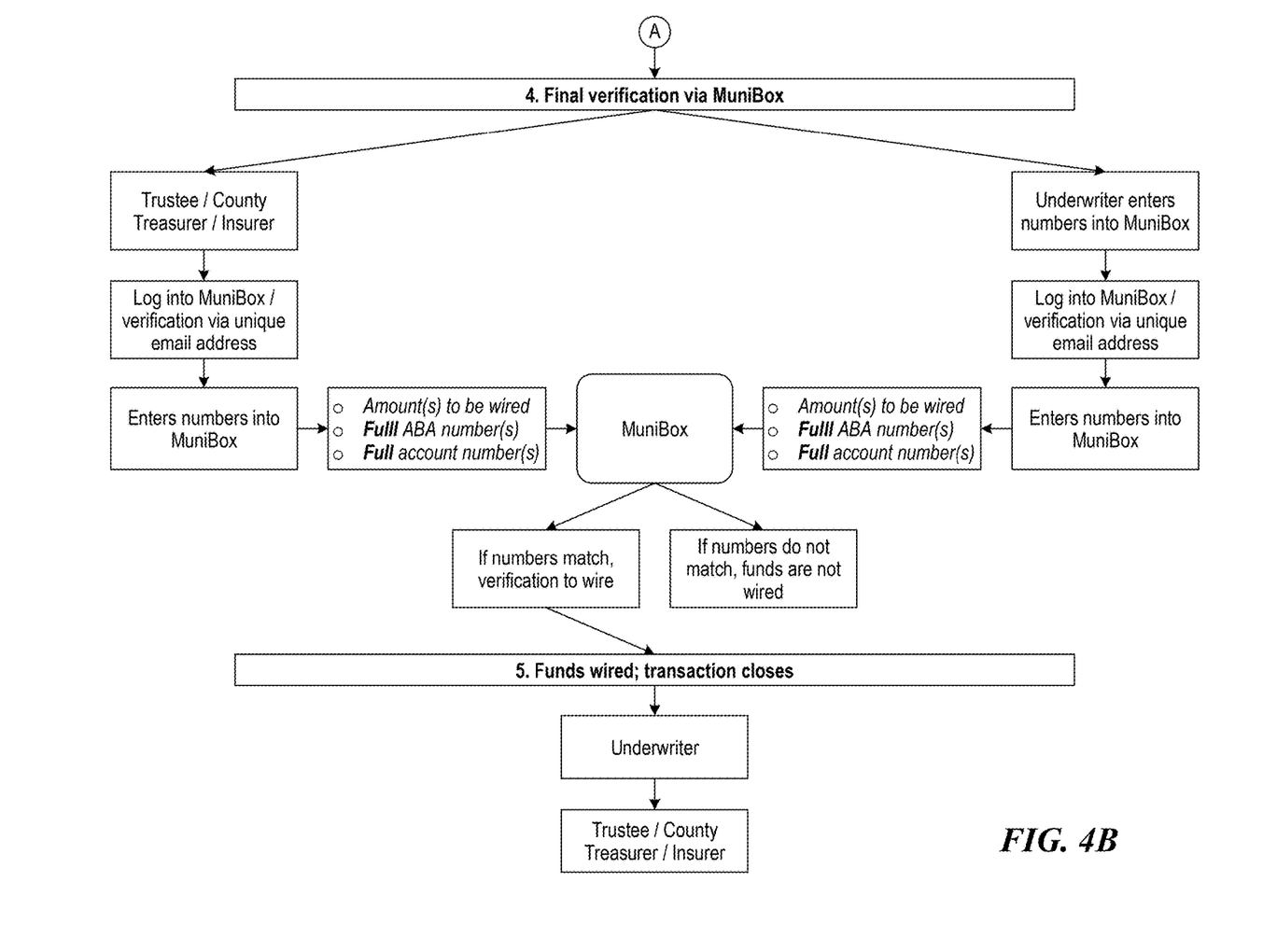

In one embodiment, prior to the closing, both the underwriter and the Wire Receivers will pre-register with the platform. Once registration is confirmed, their participation in the particular financing transaction can be confirmed. On or near the day before the wire is to be sent, either the underwriter (or some other Wire-Sender) or the Wire Receivers will enter into the platform's portal (e.g., website) a) the amount to be wired; b) the bank routing number and c) the bank account number. While certain information (e.g., the amount of each wire) will be viewable by all other registered website participants, confidential information including account numbers will only be viewable to the Wire-Sender and the Wire-Receivers. Once information is entered by one of the two parties, it must be electronically confirmed or edited by the corresponding party. If edited, it must be reviewed and approved by the party that originally entered the information. Once approved by both parties if may not be altered. In the event edits are made by either party after the information has been approved by both the Wire-Sender and the Wire-Receiver, verification information is erased and the transaction information must be reentered from the beginning of the process.

Figure 2:
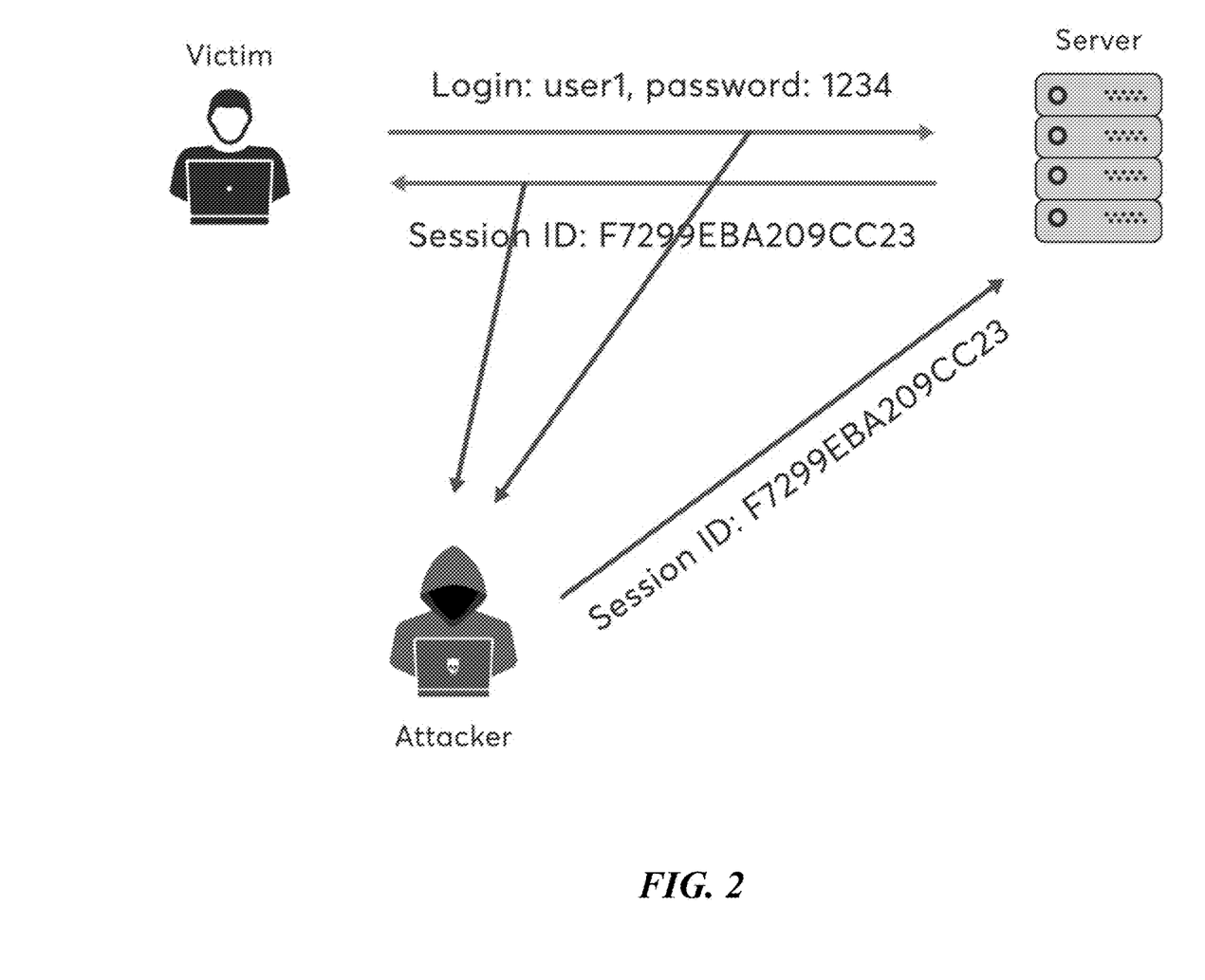
FIG. 2 illustrates an email format Man-In-The-Middle attack.

FIG. 2 illustrates an email format MITM attack. Any method that allows an attacker to read third-party communication between two people is considered a MITM attack. The attacker's goal is to stay undetected, so attackers will often breach a network or personal account to read information as two parties communicate and do nothing that would alert them of the attacker's activity.

One common method of MITM attack is email hijacking. Email hijacking is another form of man-in-the-middle attack, in which the hacker compromises and gain access to a target's email account. The attacker then silently monitors the communications between the client and the provider and uses the information for malicious purposes.

For instance, at an opportune moment, the attacker might send a message from the victim's account to their bank and instruct them to transfer funds to the attacker's bank account. They might also use the email to take over other online accounts tied to the email account. They may also alter data on attachments shared between a group of users as sent from the compromised user's email address.

Email hijacking is usually staged through phishing and other social engineering scams, in which attackers deceive victims into revealing their credentials by directing them to bogus login pages or tricking them into installing a keylogger malware, which records the victim's keystrokes and sends it to a remote server that the attacker owns.

Figure 3:
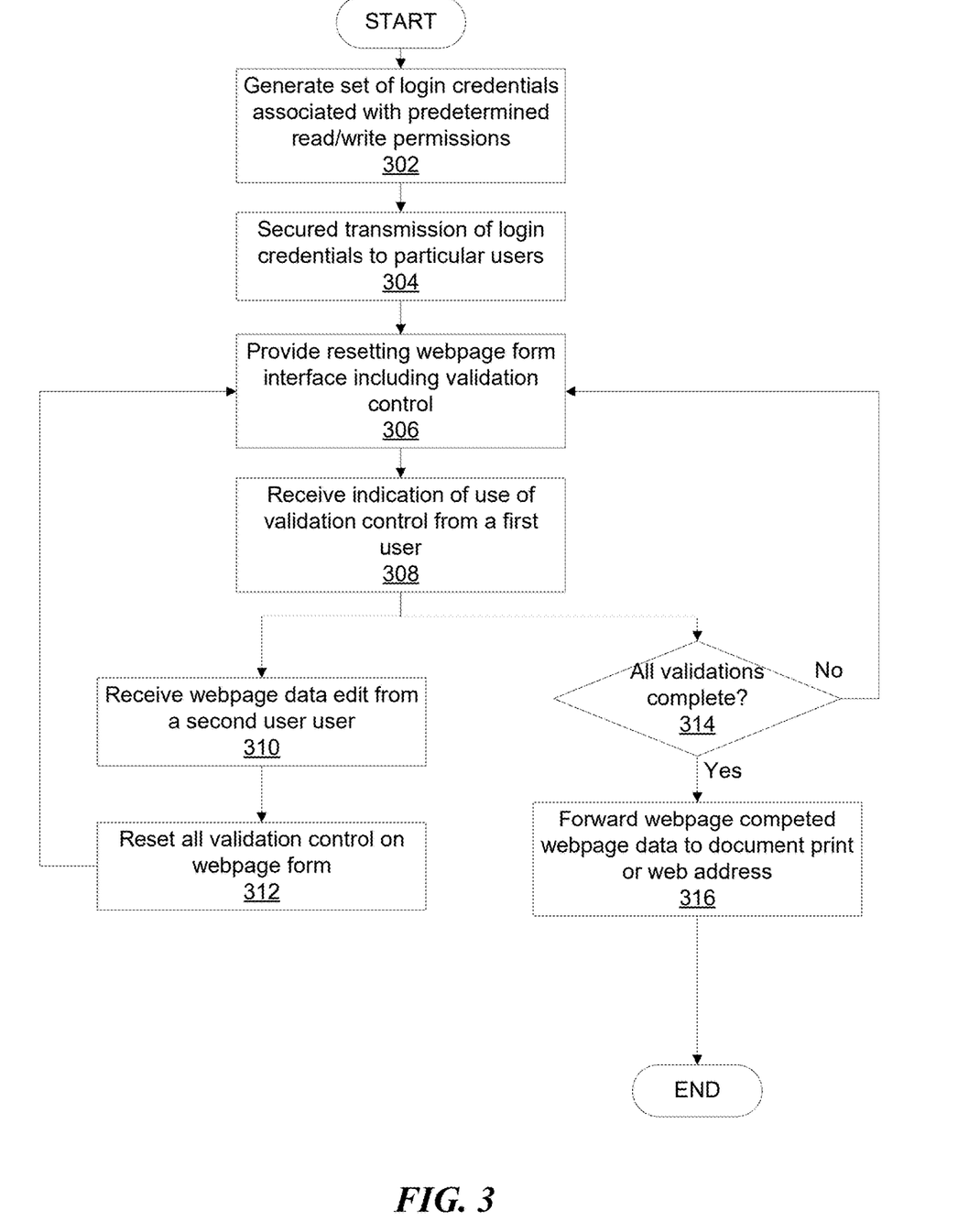
FIG. 3 illustrates a flowchart depicting a method for performing a bifurcated process confirmation via a resetting webpage form defending against man-in-the-middle attacks.

FIG. 3 illustrates a flowchart depicting a method for performing a bifurcated process confirmation via a resetting webpage form defending against man-in-the-middle attacks. In step 302, a host server generates a set of login credentials associated with two classes of users to a webpage form. The two classes of users include a first user class and a second user class. Examples of the user classes are parties to a transaction (sender/receiver) and validators or verification professionals overseeing the transaction. The different user classes have different permissions on the webpage form.

In some embodiments, the set of login credentials associated with the first user class has only limited read and verification privileges on the webpage form with respect to webpage data. That is, those users may read the information on the webpage form, but not edit that information. However, those users are enabled to verify the veracity of the information through a user interface control (e.g., a sign off or a check box). In some embodiments, those users are only able to read the portions of the webpage data that they themselves are validating/verifying. In some embodiments, the set of login credentials associated with the second user class has both read and edit privileges on the webpage form with respect to webpage data. For example, the sender and receiver in the transaction are enabled to read all of the webpage data and edit all of it as well.

In step 304, the host server transmits the set of login credentials to associated users via a two-party secured key exchange. Examples of two-party secured key exchanges are a Diffie-Hellman exchange or Rivest-Shamir-Adleman key exchange. Diffie-Hellman key exchanges are a method of digital encryption that securely exchanges cryptographic keys between two parties over a public channel without their conversation being transmitted over the internet. The two parties use symmetric cryptography to encrypt and decrypt their messages. The Diffie-Hellman key exchange is commonly found in security protocols, such as Transport Layer Security (TLS), Secure Shell (SSH) and IP Security (IPsec).

Even though Diffie-Hellman key exchange can be used for establishing both public and private keys, the Rivest-Shamir-Adleman algorithm, or RSA algorithm, can also be used, since the RSA algorithm is able to sign public key certificates.

To implement Diffie-Hellman, two end users, Alice and Bob, mutually agree on positive whole numbers p and q, such that p is prime and q is a generator of p. The generator q is a number that, when raised to positive whole-number powers less than p, never produces the same result for any two such whole numbers. The value of p may be large, but the value of q is usually small.

Once Alice and Bob have agreed on p and q in private, they choose positive whole-number personal keys a and b. Both are less than the prime number modulus p. Neither user divulges their personal key to anyone; ideally, they memorize these numbers and don't write them down or store them anywhere. Next, Alice and Bob compute public keys a* and b*based on their personal keys. The two users can share their public keys a* and b* over a communications medium assumed to be insecure, such as the internet or a corporate wide area network. From these public keys, a number x can be generated by either user on the basis of their own personal keys.

The value of x turns out to be the same according to either of the above two formulas. However, the personal keys a and b, which are critical in the calculation of x, haven't been transmitted over a public medium. Because it's a large and apparently random number, a potential hacker has almost no chance of correctly guessing x, even with the help of a powerful computer to conduct millions of trials. The two users can, therefore, in theory, communicate privately over a public medium with an encryption method of their choice using the decryption key x. The above description relates to entities, "Alice" and "Bob," however, these entities are merely exemplary and may be computing devices.

In step 306, the host server provides a user interface of the webpage form that includes a verification control associated with each of a plurality of users of the first user class bifurcating verification of the webpage data to each corresponding set of login credentials of the first user class. Non-limiting examples of verification control include a small DocuSign™ field, a check box or radio button, a manual signature input, a text field seeking matching data as the data verified, or a s-signature field. In some embodiments the individual users of the first class of user only view/read the portions of the webpage form as is validated by them.

In step 308, the webpage form receives a verification indication from a first user of the first user class via a first user's login credentials. The associated user reviews the data and in the course of operation validates that information. The validation is indicated through the user interface control. If this step does not occur (e.g., the data validation is rejected) the user may indicate that through interface controls or include notes on the data on the webpage form. Alternatively, an offline communication may indicate that some issue exists.

In step 310, after a validation is received, the webpage form receives a modification to the webpage data from a second user of the second user class via a second user's login credentials. That is, a user logged in to the webpage form with write privileges and makes a change to the webpage data. In order for this user to be an attacker, the credentials need to have become compromised.

In step 312, in response to receiving the modification to the webpage data, the webpage form resets each of the verification controls associated with each of the first user class including the verification control associated with the first user's login credentials. Thus, anytime an edit in the webpage form data occurs all of the verification users need to reverify the data. Unlike email communications which do not necessarily have any version control aspects, the webpage form resets upon receipt of an edit to the webpage data.

In the event the editing user's login credentials had become compromised, all of the verifying users are alerted to the change because their verification is reversed, and those users each individually need to reverify anything they had previously verified. The bane of the MITM attacker is alerts that something had changed. In order to attack the resetting webpage, the MITM attacker would need to compromise all users in the information transaction.

In step 314, the host server determines whether all of the validation controls have been completed. In step 316, in response to completion of each verification control, the host server generates an unmodifiable electronic document of current webpage data or transmits the current webpage data to an address indicated by the current webpage data. In some embodiments the address may be that of an underwriter, a trustee, a county treasurer, or an insurer, or all of the above. The unmodifiable document enables records to be kept.

FIGS. 4A and 4B illustrate the system for performing a bifurcated process confirmation via a resetting webpage form defending against man-in-the-middle attacks.

The platform receives an indication of information included in an electronic closing memo. The closing memo is a document prepared by an underwriter or municipal advisor. The information includes a name of a recipient, a name of a recipient bank, a source and use of funds, an amount of funds to be wired, an ABA number (partial or full), an account number (partial or full), and/or a special instruction. Copies of the electronic closing memo are distributed, via an unsecured or secured email, to all participants of the financial transaction including legal counsel, trustee/county treasurer, underwriter, municipal advisor and other team members.

The platform performs bifurcated verification of the financial transaction where each of a first party (e.g., the Wire-Receivers) and a second party (e.g., the Wire-Sender) independently logs onto the platform and either input, verify and accept or edit the information including amounts to be wired, the full ABA numbers, and the full account number.

Computer System

Figure 5:
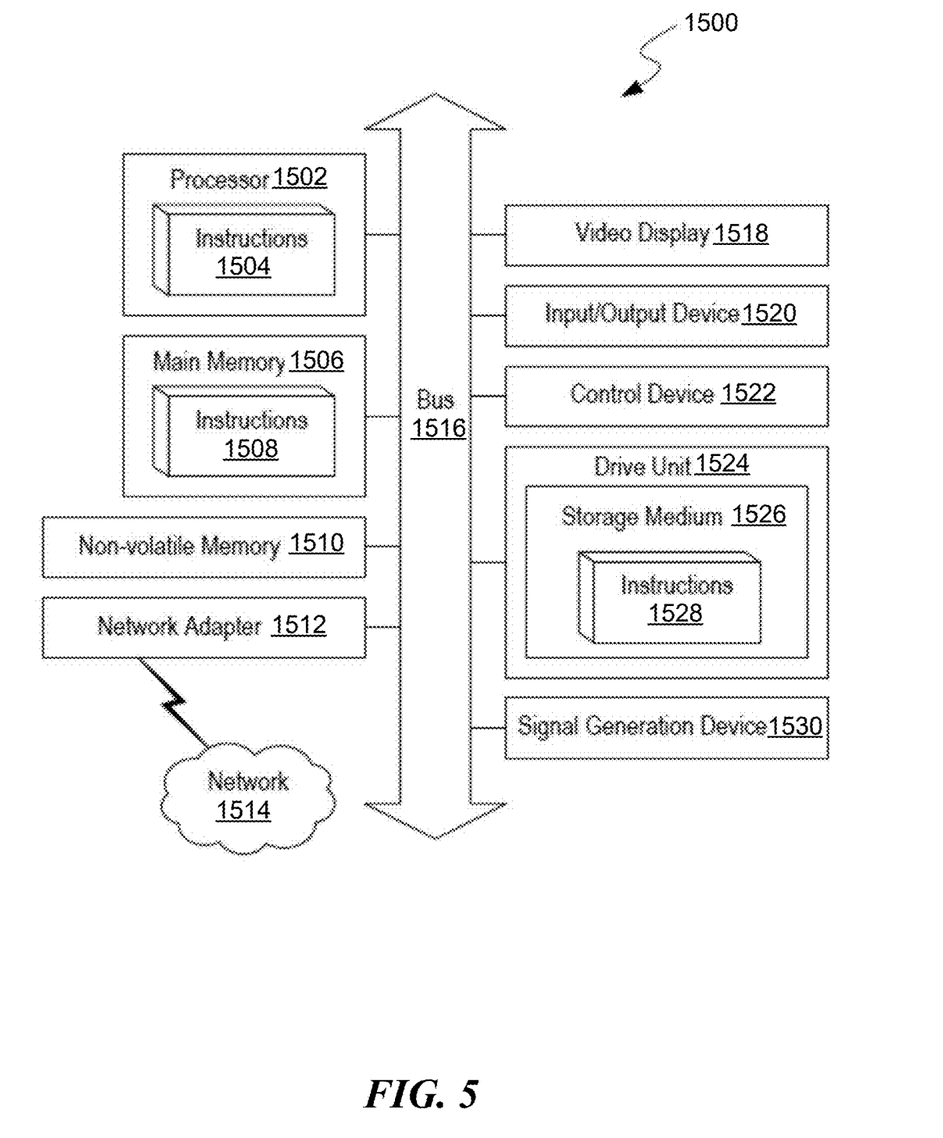
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A system for performing a bifurcated process confirmation via a resetting webpage form defending against man-in-the-middle attacks, the system comprising:
   a host server operated by a processor; and
   a memory including instructions that when executed cause the host server to:
   generate a set of login credentials associated with two classes of users to a webpage form, the two classes of users including a first user class and a second user class, wherein the set of login credentials associated with the first user class has only limited read and verification privileges on the webpage form with respect to webpage data and wherein the set of login credentials associated with the second user class has both read and edit privileges on the webpage form with respect to webpage data;
   transmit the set of login credentials to associated users via a two-party secured key exchange between the host server and the respective associated user;
   provide a user interface of the webpage form that includes a verification control associated with each of a plurality of users of the first user class bifurcating verification of the webpage data to each corresponding set of login credentials of the first user class;
   receive, by the webpage form, a verification indication from a first user of the first user class via a first user's login credentials;
   subsequent to said receiving the verification indication, receive a modification to the webpage data from a second user of the second user class via a second user's login credentials; and
   in response to receiving the modification to the webpage data, reset each of the verification controls associated with each of the first user class including the verification control associated with the first user's login credentials.

2. The system of claim 1, wherein the two-party secured key exchange is a Diffie-Hellman or Rivest-Shamir-Adleman key exchange.

3. The system of claim 1, wherein the set of login credentials associated with the second user class do not have associated verification privileges.

4. The system of claim 1, wherein the limited read and verification privileges associated with the webpage data corresponding to the first user class are associated with a subsection of the webpage data associated with particular users of the first user class.

5. The system of claim 1, wherein the webpage data is associated with a municipal bond closing and wherein includes a name of a recipient, a name of a recipient bank, a source and use of funds, an amount of funds to be wired, an ABA number, an account number.

6. The system of claim 1, the instructions further comprising:
   in response to completion of each verification control, generating an unmodifiable electronic document of current webpage data.

7. The system of claim 1, the instructions further comprising:
   in response to completion of each verification control, transmitting current webpage data to an address indicated by the current webpage data.

8. A method for performing a bifurcated confirmation process via a resetting webpage form defending against man-in-the-middle attacks, the method comprising:
   generating a set of login credentials to a webpage form wherein each set of login credentials have predetermined corresponding read and write privileges on the webpage form with respect to webpage data;
   providing a user interface of the webpage form that includes a verification control associated with each of a plurality of users bifurcating verification of the webpage data to each corresponding set of login credentials;
   receiving, by the webpage form, a verification indication from a first user via a first user's login credentials, wherein the first user's login credentials only have read privileges associated with the webpage data corresponding to the verification control associated with the first user;
   subsequent to said receiving the verification indication, receiving a modification to the webpage data; and
   in response to receiving the modification to the webpage data, resetting each of the verification controls associated with each of the plurality of users including the verification control associated with the first user's login credentials.

9. The method of claim 8, wherein only a set of login credentials associated with a second user and a third user includes write privileges on the webpage form of the webpage data.

10. The method of claim 9, wherein the set of login credentials associated with the second user and the third user do not have associated verification controls.

11. The method of claim 8, wherein the webpage data is associated with a municipal bond closing and wherein includes a name of a recipient, a name of a recipient bank, a source and use of funds, an amount of funds to be wired, an ABA number, an account number.

12. The method of claim 8, further comprising:
   in response to completion of each verification control, generating an unmodifiable electronic document of current webpage data.

13. The method of claim 8, further comprising:
in response to completion of each verification control, transmitting current webpage data to an address indicated by the current webpage data.

14. A non-transitory computer-readable medium having executable instructions stored thereon for performing a bifurcated process confirmation via a resetting webpage form defending against man-in-the-middle attacks, that when executed by one or more processors, perform the operations of:
generate a set of login credentials to a webpage form wherein each set of login credentials have predetermined corresponding read and write privileges on the webpage form with respect to webpage data;
provide a user interface of the webpage form that includes a verification control associated with each of a plurality of users bifurcating verification of the webpage data to each corresponding set of login credentials;
receive, by the webpage form, a verification indication from a first user via a first user's login credentials, wherein the first user's login credentials only have read privileges associated with the webpage data corresponding to the verification control associated with the first user;
subsequent to said receiving the verification indication, receive a modification to the webpage data; and
in response to receiving the modification to the webpage data, reset each of the verification controls associated with each of the plurality of users including the verification control associated with the first user's login credentials.

15. The non-transitory computer-readable medium of claim 14, wherein only a set of login credentials associated with a second user and a third user includes write privileges on the webpage form of the webpage data.

16. The non-transitory computer-readable medium of claim 15, wherein the set of login credentials associated with the second user and the third user do not have associated verification controls.

17. The non-transitory computer-readable medium of claim 14, wherein the webpage data is associated with a municipal bond closing and wherein includes a name of a recipient, a name of a recipient bank, a source and use of funds, an amount of funds to be wired, an ABA number, an account number.

18. The non-transitory computer-readable medium of claim 14, the instructions further comprising:
in response to completion of each verification control, generating an unmodifiable electronic document of current webpage data.

19. The non-transitory computer-readable medium of claim 14, the instructions further comprising:
in response to completion of each verification control, transmitting current webpage data to an address indicated by the current webpage data.

* * * * *